(12) United States Patent
Takano et al.

(10) Patent No.: US 6,747,388 B2
(45) Date of Patent: Jun. 8, 2004

(54) LAMINATED IRON CORE FOR ROTARY ELECTRIC MACHINE

(75) Inventors: Tadashi Takano, Shuuchi-gun (JP); Hayato Ariyoshi, Shuuchi-gun (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 0 days.

(21) Appl. No.: 10/065,543

(22) Filed: Oct. 29, 2002

(65) Prior Publication Data
US 2003/0090168 A1 May 15, 2003

(30) Foreign Application Priority Data
Nov. 9, 2001 (JP) ........................................ 2001-344682

(51) Int. Cl.[7] .................................................. H02K 1/06
(52) U.S. Cl. ....................................................... 310/217
(58) Field of Search ................................. 310/216, 217, 310/254, 42; 29/596–598, 609, 738

(56) References Cited

U.S. PATENT DOCUMENTS

| 5,142,178 A | * | 8/1992 | Kloster et al. | ............... 310/217 |
| 5,338,996 A | * | 8/1994 | Yamamoto | .................. 310/217 |
| 6,002,191 A | * | 12/1999 | Saban | ........................ 310/216 |

* cited by examiner

Primary Examiner—Tran Nguyen
(74) Attorney, Agent, or Firm—Ernest A. Beutler

(57) ABSTRACT

Several embodiments of laminated cores for coil winding in rotating electric machines. In each embodiment, the laminations are formed with indented portions in an area where the flux pattern will not be disturbed with the indentation serving the purpose of aligning the sheets of the laminations with each other. In preferred embodiments, the indentations are formed in the peripheral edge of the circular core portion from which the pole teeth extend.

8 Claims, 3 Drawing Sheets

LAMINATED IRON CORE FOR ROTARY ELECTRIC MACHINE

BACKGROUND OF INVENTION

This invention relates to a rotating electrical machine and more particularly to an improved core lamination arrangement for such machines.

It has been known in rotating electrical machines to employ a core arrangement that has a core ring from which a plurality of core pole teeth radially extends. Conventionally, these cores are made from laminated ferromagnetic material sheets. Some arrangement is normally provided for insuring that the individual sheets of the lamination maintain their alignment.

Normally this is done by placing one or more indentations in the ring portion of the core. These indentations form a depression in one side and a complimentary projection on the other side. The projection of one sheet enters into the depression on the adjacent sheet so as to maintain the sheets in alignment. Normally the shape of these projections is that of a conical shape having a V configuration. Because of this configuration, it has been necessary to position the indentations in the ring part between its inner and outer peripheral edges.

A disadvantage with that type of construction is that the indentations form a disturbance in the flux field and the magnetic resistance increases. This deteriorates the magnetic properties of the core.

It is, therefore, a principal object to this invention to provide an improved arrangement for maintaining the positioning of the laminations of a rotating machine core without interfering with the flux characteristics thereof.

SUMMARY OF INVENTION

This invention is adapted to be embodied in a laminated core for a rotary electric machine. The core comprises a plurality of stacked lamination sheets formed from an electromagnetic material. Each of the lamination sheets is comprised of a circular core portion from which a plurality of circumferentially spaced pole teeth extends to receive coil windings. The peripheral edge of the circular core portion spaced from said pole teeth is formed with an indented portion forming a peripheral projection on one side thereof and a peripheral recess on the other side thereof. The peripheral projection of each of the lamination sheets is received in the peripheral recess of the adjacent of the lamination sheets for interlocking the lamination sheets.

In accordance with one embodiment, a single indented portion is formed around the entire peripheral edge of the circular core portion of each of the lamination sheets.

In accordance with another embodiment, a plurality of circumferentially spaced indented portions are formed around the peripheral edge of the circular core portion of each of the lamination sheets.

DETAILED DESCRIPTION

Figure 1:
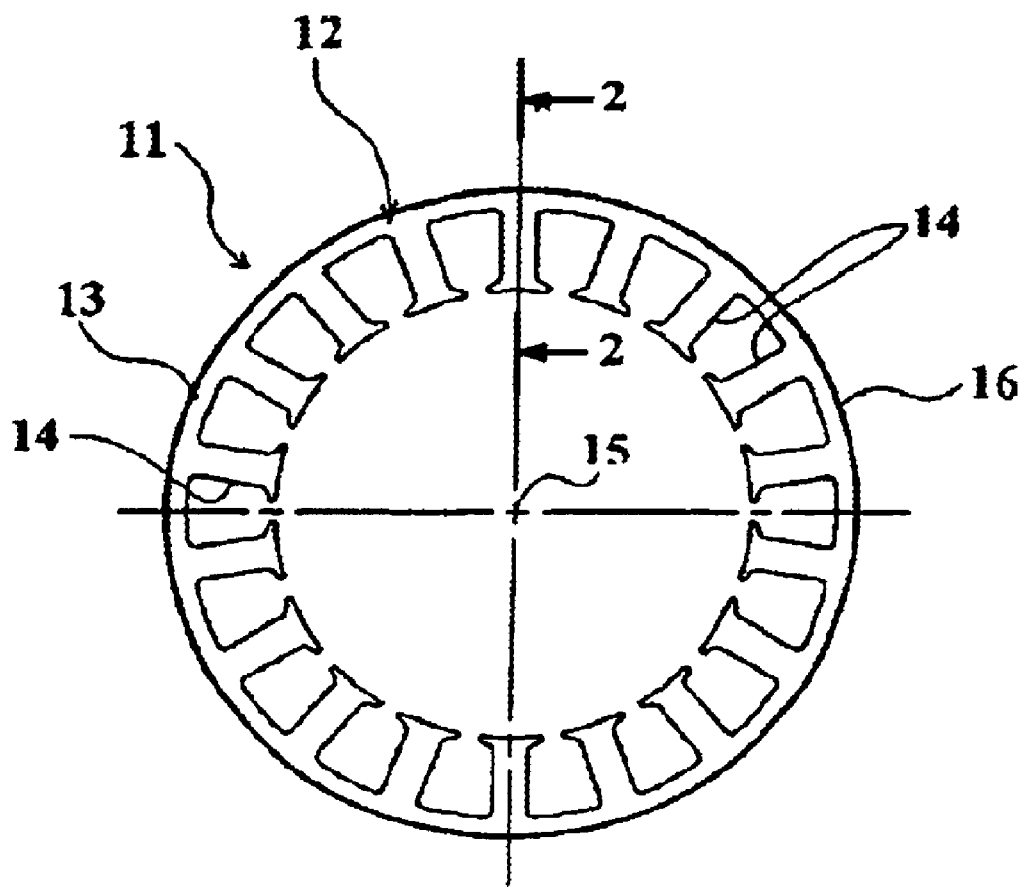
FIG. 1 is a plan view, showing a laminated core for a rotating electric machine constructed in accordance with one embodiment of the invention.
Figure 2:
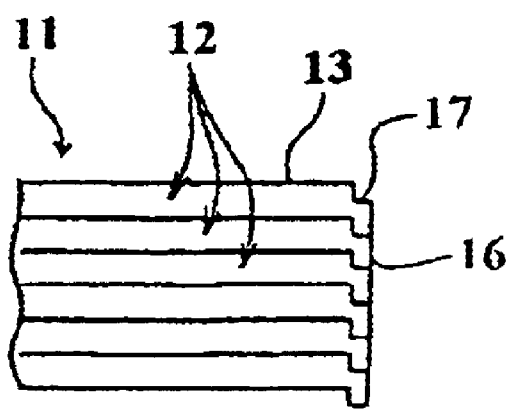
FIG. 2 is a cross sectional view taken along the line 2—2 in FIG. 1.

Referring now in detail to the drawings and initially to the embodiment of FIGS. 1 and 2, the reference numeral 11 denotes a ferromagnetic core comprised of the thin sheets 12 of silicon steel that are punched in an identical shape and then laminated. In the illustrated embodiments, the thin sheets 12 are formed with a circular outer ring portion 13 and eighteen projecting pole teeth 14 that extend from the circular ring portion 13 toward the rotational center 15 of the associated electric machine. The projecting pole teeth 14 of the thin sheet 12 are disposed circumferentially at a regular interval. Although both of the embodiments illustrated have their pole teeth extending radially inwardly from the ring portions, it will readily be apparent to those skilled in the art that the invention, now to be described may also be used with inner ring cores where the pole teeth extend radially outwardly from the ring portion.

Figure 4:
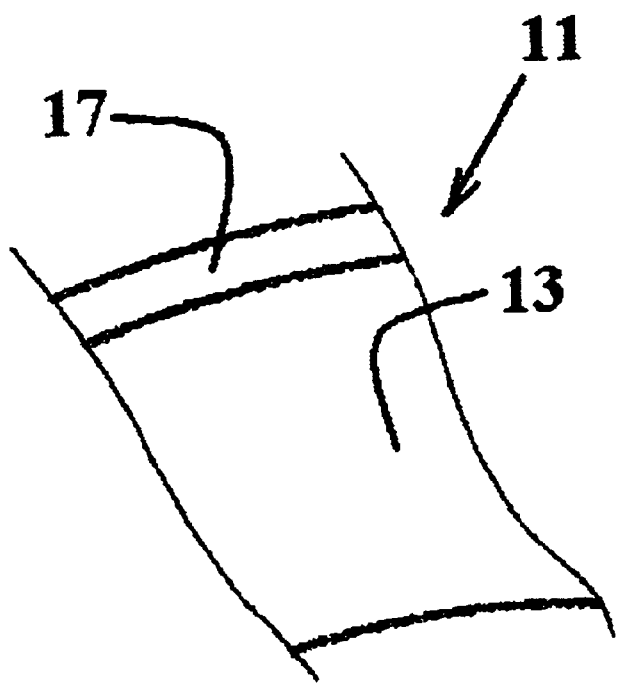
FIG. 4 is an enlarged partial view looking in the same direction as FIG. 1 showing the indentation of this embodiment.

On the outer periphery edge 16 of each of the thin sheets 12, that is, on the outer contour of the outside ring portion 14, a continuous annular indented portion 17 is formed, as seen best in FIG. 4. This forms a projection on one side of each sheet and a recess on the other side, as seen in FIG. 2. The indented portion 17 conveniently can formed at the same time the thin sheet 12 is punched. When the thin sheets 12 are laminated one by one, the projecting portion of the indented area 17 of each thin sheet 12 is engaged in the facing recess portion of the adjacent thin sheet 12 to lock them together as shown in FIG. 2.

When each of the thin sheets 12 is laminated as described above, it is understood that the angular positions thereof in the circumferential direction are aligned in a suitable fashion so that the projecting pole teeth 14 of each of the thin sheets 12 overlap. Then a stator coil (not shown) around the pole teeth 14 of the ferromagnetic core 11 made by laminating the thin sheets 12 in such a manner. A cooperating permanent magnet element having circumferentially spaced permanent magnets of alternating polarity (not shown) then is disposed inside of the wound core 11.

For example, in case of a permanent magnet type brushless DC motor, a plurality of magnets are fixed circumferentially at a regular interval is rotatably journalled inside of the wound core 11. The rotation angle of the rotor is detected by rotation angle sensors having Hall elements, and then a rotational magnetic field is generated by switching the magnetization of wound core 11 according to the rotation angle of the rotor.

Figure 3:
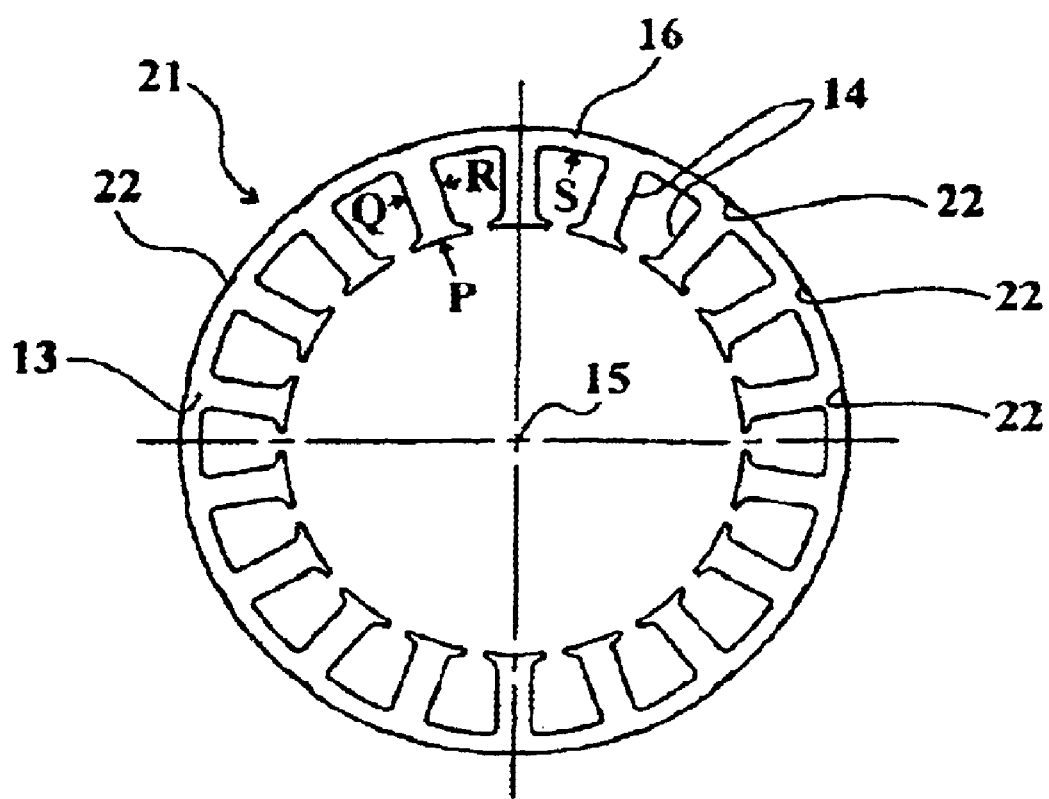
FIG. 3 is a plan view, in part similar to FIG. 1, showing another embodiment.

FIG. 3 is also a plan view of a ferromagnetic core 21 for the stator of a motor. Except for the indentations, this core 21 is the same as the embodiment of FIGS. 1 and 2. Therefore like parts are identified by the same reference numerals.

Figure 5:
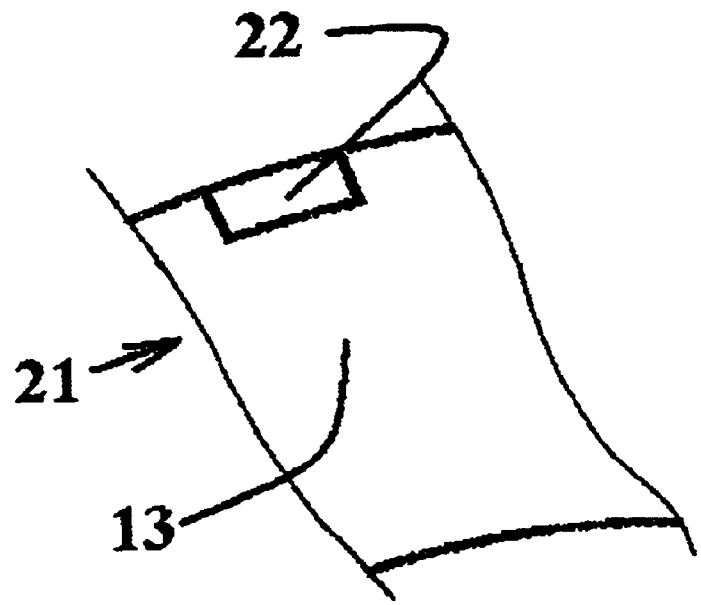
FIG. 5 is an enlarged partial view looking in the same direction as FIG. 3 showing the indentation of this embodiment

In the ferromagnetic core 21 of this embodiment, eighteen indented portions are provided circumferentially at a regular interval as best seen in FIG. 5, alternative to the single annular indented portion 17 as shown in FIGS. 1 and 2.

In the illustrated embodiment of FIG. 3, the indented portions 22 are positioned in circumferential alignment with the eighteen projecting pole teeth 14. Thus, the indented portions 22 are disposed to be a predetermined and identical pattern at predetermined eighteen positions in the circumferential direction of the thin sheets. That is, each of the indented portions 22 is located on the line between the rotational center 15 and the corresponding projecting pole tooth 14.

Here, each of the thin sheets has repeated identical patterns, in which the indented portions 22 are located equally spaced in its circumferential direction. The thin sheets can be therefore laminated without relative deviation in the circumferential direction of the projecting pole teeth 14 and the lamination can be easily performed. As for other parts in FIG. 3, the same reference numerals denote the similar parts shown in FIG. 1.

The positions of the indented portions are not limited to that shown in FIGS. 1 and 3, as long as no interference with the magnetic flux occurs. For example, as shown by arrows P, Q, R and S in FIG. 3, a similar result can be obtained if the indented portions 22 are disposed at front edge points P, side edge points Q and R of the projecting pole teeth 14, and bottom points S of grooves (slots) between adjacent projecting pole teeth 14. Further, a plurality of positions of these points may be combined, or the indented portions 17 and 22 as shown in FIGS. 1 and 3 may be combined.

In addition to coupling the thin sheets 12 using the indented portions 17, 22 as described above, the outer face of the laminated ferromagnetic cores 11, 21 can be welded approximately parallel to the center axis 15, for example, by laser beam welding. Using any technique of welding together along with the indented portions allows the laminated thin sheets 12 to be further rigidly secured.

It should be readily apparent from the foregoing description that the described embodiments provide very effective arrangements for aligning the core laminations of rotating electrical machines. However these are preferred embodiments and those skilled in the art will readily understand that various changes and modifications may be made by those skilled in the art without departing from the scope and spirit of the invention, as defined by the appended claims.

What is claimed is:

1. A laminated core for a rotary electric machine, said core comprising a plurality of stacked lamination sheets formed from a electromagnetic material, each of said lamination sheets being comprise of a circular core portion having circumferentially extending and radially spaced inner and outer peripheral edges and a plurality of circumferentially spaced teeth extending radially from one of said peripheral edges to receive coil windings, the other of said peripheral edges of said circular core portion being formed with an indented portion extending radially from the outer periphery thereof forming a peripheral projection on one side thereof and a peripheral recess on the other side thereof, the peripheral projection of each of said lamination sheets being received in the peripheral recess of the adjacent of said lamination sheets for interlocking said lamination sheets.

2. A laminated core for a rotary electric machine as set forth in claim 1, wherein a single indented portion is formed around the entire peripheral edge of each of the lamination sheets.

3. A laminated core for a rotary electric machine as set forth in claim 2, wherein the teeth extend radially inwardly from the cores of the lamination sheets and the single indented portion is formed on the radial outer periphery of said lamination sheets.

4. A laminated core for a rotary electric machine as set forth in claim 1, wherein a plurality of circumferentially spaced indented portions are formed around the peripheral edge of each of the lamination sheets.

5. A laminated core for a rotary electric machine as set forth in claim 4, wherein the indented portions have equal circumferential spacing.

6. A laminated core for a rotary electric machine as set forth in claim 5, wherein the indented portions are circumferentially aligned with the pole teeth.

7. A laminated core for a rotary electric machine as set forth in claim 6, wherein the number of the indented portions is equal to the number of pole teeth.

8. A laminated core for a rotary electric machine as set forth in claim 7, wherein the teeth extend radially inwardly from the cores of the lamination sheets and the indented portions are formed on the radial outer periphery of said lamination sheets.

* * * * *